(12) United States Patent
Barboni

(10) Patent No.: US 8,978,875 B2
(45) Date of Patent: Mar. 17, 2015

(54) CONVEYOR BELT CLEANER

(71) Applicant: Paul Barboni, Erie, PA (US)

(72) Inventor: Paul Barboni, Erie, PA (US)

( * ) Notice: Subject to any disclaimer, the term of this patent is extended or adjusted under 35 U.S.C. 154(b) by 61 days.

(21) Appl. No.: 13/848,983

(22) Filed: Mar. 22, 2013

(65) Prior Publication Data

US 2013/0248327 A1 Sep. 26, 2013

Related U.S. Application Data

(60) Provisional application No. 61/614,022, filed on Mar. 22, 2012.

(51) Int. Cl.
*B65G 45/22* (2006.01)
*B65G 45/24* (2006.01)

(52) U.S. Cl.
CPC ............... *B65G 45/22* (2013.01); *B65G 45/24* (2013.01)
USPC ............................ 198/495; 198/497; 198/494

(58) Field of Classification Search
USPC .................... 198/493, 494, 495, 497
See application file for complete search history.

(56) References Cited

U.S. PATENT DOCUMENTS

| | | | | |
|---|---|---|---|---|
| 4,051,211 A * | 9/1977 | Beser et al. | ...................... | 264/51 |
| 4,960,200 A * | 10/1990 | Pierce | ........................... | 198/495 |
| 5,333,724 A * | 8/1994 | Wingfield et al. | ............ | 198/495 |
| 6,651,803 B2 * | 11/2003 | Virippil et al. | ................ | 198/495 |
| 6,971,503 B2 | 12/2005 | Thompson | | |
| 7,225,915 B2 | 6/2007 | Kelly et al. | | |
| 2010/0243410 A1 | 9/2010 | Hall et al. | | |
| 2011/0067978 A1 | 3/2011 | Carman et al. | | |

* cited by examiner

*Primary Examiner* — Leslie A Nicholson, III
(74) *Attorney, Agent, or Firm* — Muncy, Geissler, Olds & Lowe, P.C.

(57) ABSTRACT

A cleaning device configured to clean an outer surface of a conveyor belt on a conveyor belt system is disclosed. The cleaning device can include a fluid dispensing device configured to dispense cleaning fluid to the outer surface of the conveyor belt. A wiping device is provided to remove excess cleaning fluid. A protective cover is provided that substantially covers at least the fluid dispensing device. Fastener mounts are provided to allow attachment of the cleaning device on top of the conveyer system.

12 Claims, 3 Drawing Sheets

CONVEYOR BELT CLEANER

CLAIM OF PRIORITY

The present Application for Patent claims the benefit of Provisional Patent Application No. 61/614,022 entitled "CONVEYOR BELT CLEANER" filed Mar. 22, 2012, by Paul Barboni and hereby expressly incorporated by reference herein in its entirety.

FIELD OF DISCLOSURE

The disclosure relates to the field of cleaning and sanitizing conveyor belt surfaces and, more particularly, to the cleaning and sanitizing of a store checkout conveyor belt surface.

BACKGROUND

It has been recognized in the industry and by the public in general that conveyor belts used in store checkouts (e.g., grocery stores, home good stores, etc.) can be a source of contamination of foods or other purchased items, due to the large number items that are in physical contact with the conveyor belt. For example, food products, cleaners, medicines, chemical products (e.g., glues, adhesives, polishes, etc.) may come in contact with the conveyor belt surfaces. Additionally, individuals may also touch, sneeze, or drool on the belt, which may lead to direct exposure to various diseases. However, the conveyor belt is not easily removed and cleaning is typically not performed on a regular basis. Accordingly, this can lead to both real and perceived dangers of contamination from the conveyor belt.

Several systems have tried to address conveyor belt cleaning and sanitizing. For example, U.S. Patent Publication 2010/0243410 discloses a cleaning system with a hollow porous roller situated on the obscured or return loop side of the conveyor belt, out of sight of the top or conveying surface of the belt. A perforated rod, positioned within the hollow porous roller, contains a cleaning and sanitizing solution, dispensable through a series of perforations in the rod. The cleaning and sanitizing solution is distributed via a pump from a tank reservoir.

However, the prior solutions for cleaning and sanitizing conveyor belts, such as that discussed above, are complicated costly to add conveyor belt assembly. Accordingly, it would be beneficial to have a cleaning system that can be added to both new and existing conveyor belt systems.

SUMMARY

Exemplary embodiments of the invention are directed to apparatuses and methods for cleaning and/or sanitizing conveyor belts.

Accordingly an embodiment includes a cleaning device configured to clean an outer surface of a conveyor belt on a conveyor belt system. A fluid dispensing device is configured to dispense cleaning fluid to the outer surface of the conveyor belt. A wiping device is configured to remove excess cleaning fluid. A protective cover is configured to substantially cover at least the fluid dispensing device. Fastener mounts are configured to allow attachment of the cleaning device on top of the conveyor belt system.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
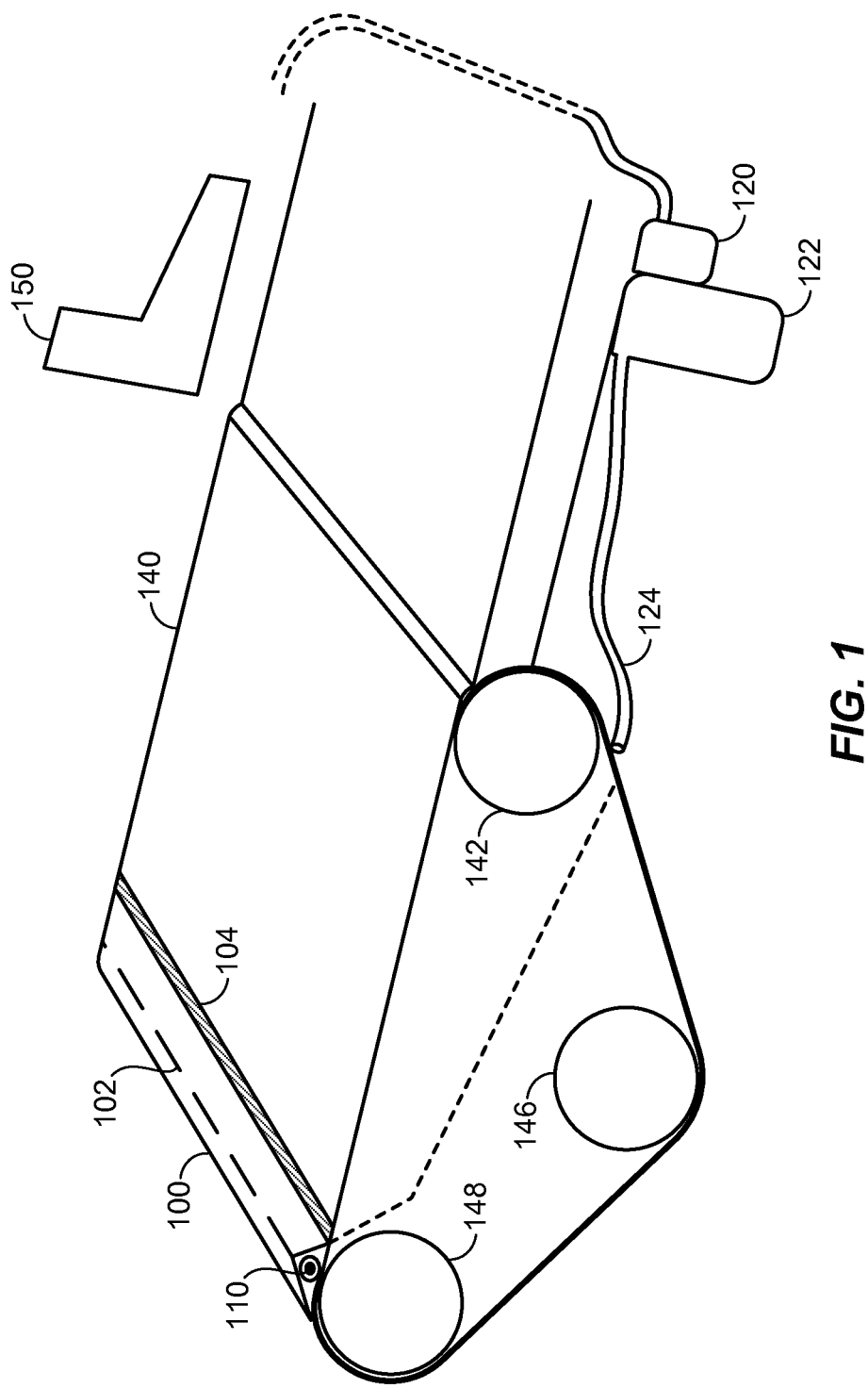
FIG. 1 is an illustration of a perspective view of a conveyor belt illustrating an embodiment with a cleaning device mounted on the top.

Referring to FIG. 1, a perspective view of a conveyor belt at a grocery store with an embodiment of the cleaning device 100 is illustrated. The conveyor belt system can include conventional elements, such as a belt 140 and rollers 142, 144, 146. Additional conventional elements, such as motors, switches, etc. are not illustrated to avoid extraneous details. Further, a representation of a cash register 150 is illustrated to provide a reference to the orientation of the conveyor belt. Likewise, the conventional details of the cash register 150 are not provided. Accordingly, it will be appreciated that the illustration is for explanation only and is not to be construed as limiting the various embodiments to the specific configuration illustrated in FIG. 1.

Referring back to FIG. 1, the cleaning device 100 is mounted on the top side of the conveyor belt system to allow for cleaning the conveyor belt 140. Cleaning device 100 includes a protective housing 102 and a wiping device 104 (illustrated as a rubber blade). The protective housing, in one example, can be made simply from bending a piece of metal to form an angle and then securing it to the other components of the cleaning device or securing the protective cover the conveyor belt system overtop at least the fluid dispensing device 110. The protective cover can be aluminum, stainless steel, plastic or any other suitable material.

The fluid dispensing device 110 can be activated by movement of the belt and/or manual operation. The fluid dispensing device 110 can be connected by a hose 124 and to a pump 120 and reservoir 122. A power line may also be provided to the cleaning device. The reservoir 122 can be used for holding cleaning fluid. The pump 120 can extract the cleaning fluid from the reservoir 122 and provide the cleaning fluid to fluid dispensing device 110. The cleaning fluid can also include disinfectants, antibacterial solutions, and the like to allow for sanitation of the top surface of the conveyor belt. Additional details of the cleaning device 100 are provided below.

Figure 2:
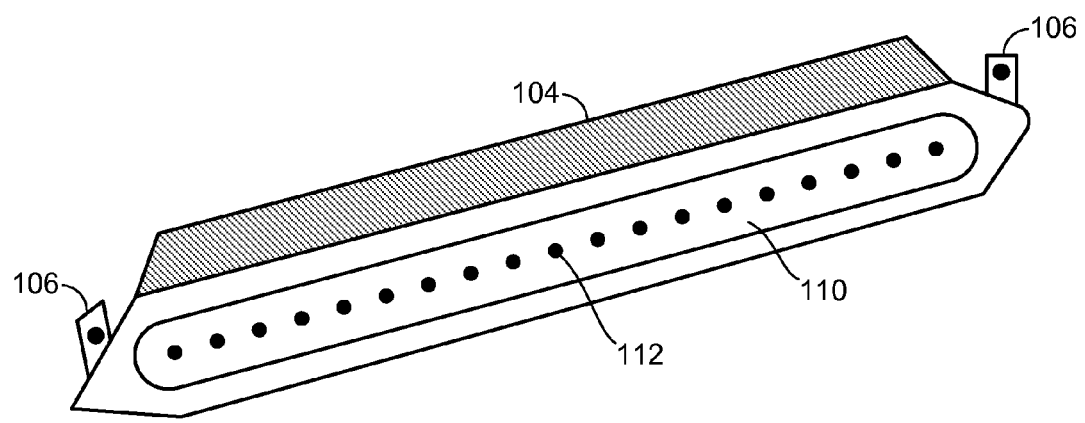
FIG. 2 is an illustration of an underside view of the cleaning assembly.

Referring to FIG. 2, an underside view of cleaning device 100 is illustrated. At opposite ends of the cleaning device 100 are fastener mounts 106 that can be adapted to various sizes of conveyor belt systems. A simple screw, bolt or other fastener type applied to the mounts can be used to secure the cleaning device 100 to the conveyor belt system. Thus allowing for a simple cost effective solution for both new designs and retrofitting existing conveyor belt systems. Alternatively, the fastener mounts 106 may employ a pressure expansion system (e.g., pressurized clamps, pistons, etc.) to secure the cleaning device 100 to the conveyor system.

Additionally, from this view it can be seen that fluid dispensing device 110 contains a plurality of holes 112, that allow the cleaning fluid to be deposit on the belt and the then is wiped off by wiping device 104.

Figure 3:
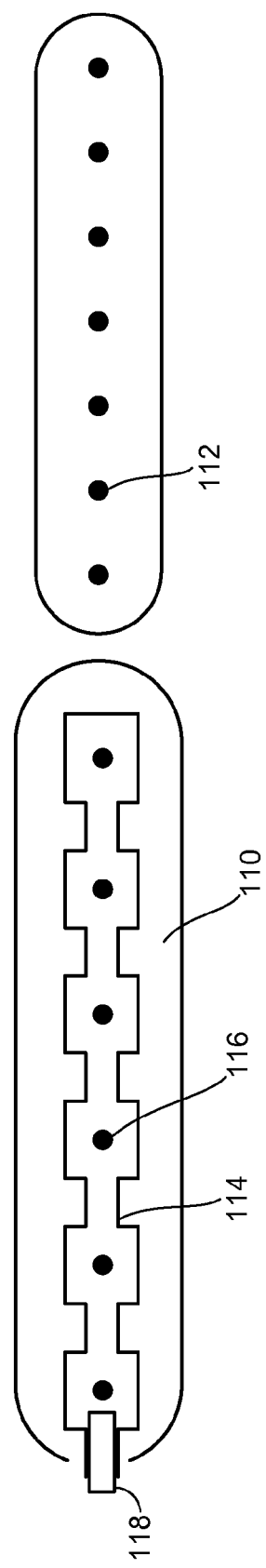
FIG. 3 is an illustration of an inner view of a spray system

Referring to FIG. 3, additional details of the fluid dispensing device 110 are illustrated. The fluid dispensing device 110 contains an inner mechanism 114 for dispensing the cleaning fluid. The inner mechanism 114 can be moved slightly to dispense the cleaning fluid, by displacing seal elements 116 from the holes 112 so that a small amount of cleaning fluid is dispensed. The holes can then be closed by a reversing the process, causing the seal elements 116 to cover the holes. In one embodiment, for example, the seals could be grommets, elastic rings, and the like made from rubber, silicone, deformable plastic or any other suitable material. A piston element 118 can be used to move the inner mechanism 114. However, a screw type device, solenoid or other like devices that can cause a linear movement of the inner mechanism 114 can be used. Likewise, the power source to cause the movement may be electric, hydraulic, pneumatic or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A cleaning device configured to clean an outer surface of a conveyor belt on a conveyor belt system, comprising:
   a fluid dispensing device configured to dispense cleaning fluid to the outer surface of the conveyor belt;
   a wiping device configured to remove excess cleaning fluid;
   a protective cover configured to substantially cover at least the fluid dispensing device; and
   fastener mounts configured to allow attachment of the cleaning device on top of the conveyor belt system, wherein the fluid dispensing device contains an inner mechanism configured to dispense the cleaning fluid, and
   wherein the inner mechanism further comprises:
   seal elements that are movable and can be moved away from holes in the fluid dispensing device to allow a small amount of cleaning fluid to be dispensed and can be moved back to cover the holes to prevent cleaning fluid from being dispensed.

2. The cleaning device of claim 1, wherein the seal elements are at least one of grommets or elastic rings.

3. The cleaning device of claim 2, wherein the seal elements are made from at least one of rubber, silicone, or a deformable plastic.

4. A cleaning device configured to clean an outer surface of a conveyor belt on a conveyor belt system, comprising:
   a fluid dispensing device configured to dispense cleaning fluid to the outer surface of the conveyor belt;
   a wiping device configured to remove excess cleaning fluid;
   a protective cover configured to substantially cover at least the fluid dispensing device;
   fastener mounts configured to allow attachment of the cleaning device on top of the conveyor belt system, wherein the fluid dispensing device contains an inner mechanism configured to dispense the cleaning fluid, and
   a piston element configured to move the inner mechanism.

5. A method for cleaning an outer surface of a conveyor belt on a conveyor belt system, comprising:
   dispensing cleaning fluid to the outer surface of the conveyor belt from a fluid dispensing device in a cleaning device;
   removing excess cleaning fluid;
   substantially covering at least the fluid dispensing device; and
   mounting in a detachable configuration the cleaning device on top of the conveyor belt system, wherein the fluid dispensing device contains an inner mechanism configured to dispense the cleaning fluid, and
   wherein the dispensing further comprises:
   moving seal elements of the inner mechanism away from holes in the fluid dispensing device to allow a small amount of cleaning fluid to be dispensed; and moving the seal elements back to cover the holes to prevent cleaning fluid from being dispensed.

6. The method of claim 5, wherein the seal elements are at least one of grommets or elastic rings.

7. The method of claim 6, wherein the seal elements are made from at least one of rubber, silicone, or a deformable plastic.

8. A method for cleaning an outer surface of a conveyor belt on a conveyor belt system, comprising:
dispensing cleaning fluid to the outer surface of the conveyor belt from a fluid dispensing device in a cleaning device;
removing excess cleaning fluid;
substantially covering at least the fluid dispensing device;
mounting in a detachable configuration the cleaning device on top of the conveyor belt system, wherein the fluid dispensing device contains an inner mechanism configured to dispense the cleaning fluid, and
displacing a piston element, wherein the piston element is configured to move the inner mechanism to dispense the cleaning fluid.

9. An apparatus for cleaning an outer surface of a conveyor belt on a conveyor belt system, comprising:
means for dispensing cleaning fluid to the outer surface of the conveyor belt from a fluid dispensing device;
means for removing excess cleaning fluid;
means for substantially covering at least the fluid dispensing device; and
means for mounting in a detachable configuration the apparatus on top of the conveyor belt system, wherein the fluid dispensing device contains an inner mechanism configured to dispense the cleaning fluid and,
wherein the means for dispensing further comprises:
means for moving seal elements of the inner mechanism away from holes in the fluid dispensing device to allow a small amount of cleaning fluid to be dispensed and for moving the seal elements back to cover the holes to prevent cleaning fluid from being dispensed.

10. The apparatus of claim 9, wherein the seal elements are at least one of grommets or elastic rings.

11. The apparatus of claim 10, wherein the seal elements are made from at least one of rubber, silicone, or a deformable plastic.

12. The apparatus of claim 9, wherein the means for moving is a piston element.

* * * * *